United States Patent
Schembri et al.

(10) Patent No.: US 12,035,123 B2
(45) Date of Patent: Jul. 9, 2024

(54) IMPULSE RESPONSE GENERATION SYSTEM AND METHOD

(71) Applicant: Sony Interactive Entertainment Inc., Tokyo (JP)

(72) Inventors: Danjeli Schembri, London (GB); Marina Villanueva Barreiro, Acoruña (ES); Alexei Smith, London (GB); Calum Armstrong, London (GB); Michael Lee Jones, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 148 days.

(21) Appl. No.: 17/719,658

(22) Filed: Apr. 13, 2022

(65) Prior Publication Data

US 2022/0345842 A1    Oct. 27, 2022

(30) Foreign Application Priority Data

Apr. 22, 2021   (GB) .................................... 2105735

(51) Int. Cl.
*H04S 7/00*       (2006.01)
*A63F 13/215*     (2014.01)
*A63F 13/25*      (2014.01)
*G06V 20/50*      (2022.01)

(52) U.S. Cl.
CPC ............ *H04S 7/301* (2013.01); *A63F 13/215* (2014.09); *A63F 13/25* (2014.09); *G06V 20/50* (2022.01); *H04S 7/303* (2013.01); *H04S 2400/15* (2013.01)

(58) Field of Classification Search
CPC ...... H04S 7/301; H04S 7/303; H04S 2400/15; A63F 13/215; A63F 13/25; G06V 20/50
See application file for complete search history.

(56) References Cited

U.S. PATENT DOCUMENTS

| | | | |
|---|---|---|---|
| 6,453,253 B1 | 9/2002 | Ito | |
| 9,591,427 B1* | 3/2017 | Lyren | ...................... G06F 3/167 |
| 10,582,299 B1* | 3/2020 | Mansour | ................ H04R 3/005 |
| 2011/0243340 A1 | 10/2011 | Kumagai | |
| 2018/0227687 A1 | 9/2018 | Thomson | |

FOREIGN PATENT DOCUMENTS

WO     2014160419 A1    10/2014

OTHER PUBLICATIONS

Combined Search and Examination report for corresponding GB Application No. GB2105735.1, 6 pages, dated Oct. 19, 2021.

(Continued)

*Primary Examiner* — Andrew L Sniezek
(74) *Attorney, Agent, or Firm* — Matthew B. Dernier, Esq.

(57) ABSTRACT

A system for determining the impulse response of an environment, the system comprising an audio emitting unit operable to emit a predetermined sound in the environment, an audio detection unit operable to record the sound output by the audio emitting unit, and an impulse response generation unit operable to identify an impulse response of the environment in dependence upon a frequency response of the audio emitting unit and/or the audio detection unit, and a difference between the predetermined sound and the recorded sound.

13 Claims, 4 Drawing Sheets

(56) References Cited

OTHER PUBLICATIONS

Michael Kerscher, et al., "Measurement and Visualization of Room Impulse Responses with Spherical Microphone Arrays" 29th Tonmeistertagung VDT International Convention, 6 pages, Jan. 2016.

Mateljan, et al., "The Comparison of Room Impulse Response Measuring Systems" Faculty of Electrical Engineering, University of Split, 10 pages, Jan. 2014.

Extended European Search Report for corresponding EP Application No. 22165014.6, 7 pages, dated Sep. 13, 2022.

* cited by examiner

IMPULSE RESPONSE GENERATION SYSTEM AND METHOD

BACKGROUND OF THE INVENTION

Field of the Invention

This disclosure relates to an impulse response system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years there has been increasing interest in optimising the playback of audio within the listener's environment. Early efforts in this direction led to innovations such as surround sound speaker systems, which enabled sound to be output to a listener from a range of different directions. The purpose of this was to increase the sense of immersion experienced by the listener, particularly when viewing video content such as a movie.

However, such systems may not be appropriate for use with a number of types of content. As technology has advanced over time there has been an increase in the range of experiences available to a user. Some of these, such as augmented reality or virtual reality content, enable the provision of content that is set within the user's own environment. This is different from more traditional media, such as movies, in which the content is set in the scene that is shown in the media—for instance, in a movie that is set on a beach, the audio is captured (and reproduced) with the intention of recreating the audio effects of the beach when the movie is watched.

Of course, such a reproduction method is not suitable for content in which the environment is not fixed for the content. That is to say that when augmented reality content is provided that is associated with an audio output, this audio output will be expected to sound different depending upon the environment in which the augmented reality content is reproduced. A user that views this content in a small room at home will expect the audio to differ with respect to a user that views the content in an echoey cavern.

For content creators, it may be considered rather impractical to generate content that is accurate for expected reproduction environments. One reason for this is the number of different reproduction environments that are possible; for a popular product, this may be hundreds of thousands of different environments as each user is likely to view content in a unique environment. Further to this, it may be difficult to obtain information in advance relating to the reproduction environment. It is therefore considered difficult for a content creator to generate content which will have audio reproduction that is tailored to the user's environment during playback.

It is in view of the above considerations that the present disclosure is provided.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
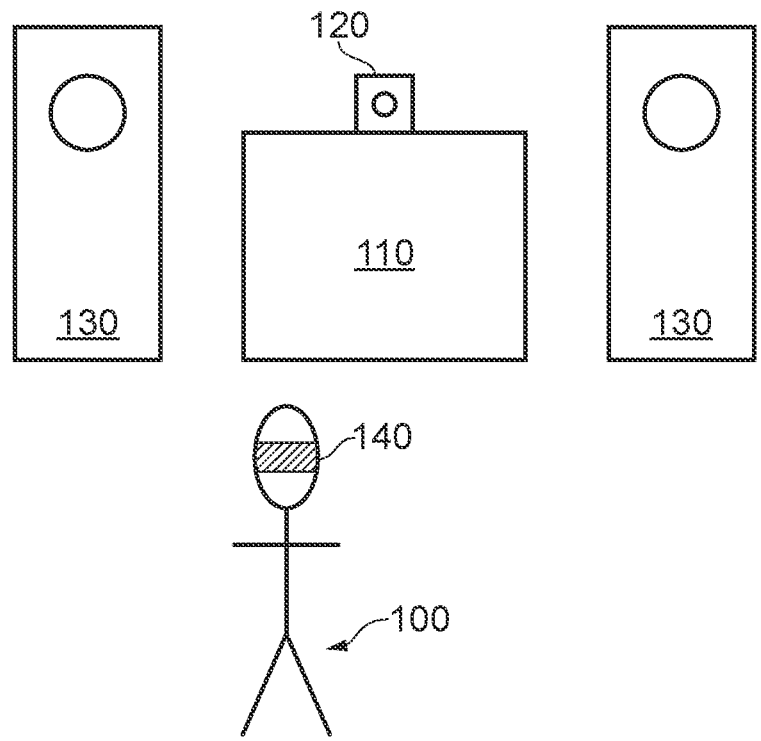
FIG. 1 schematically illustrates a content reproduction arrangement.

Referring now to the drawings, wherein like reference numerals designate identical or corresponding parts throughout the several views, embodiments of the present disclosure are described.

Embodiments of the present disclosure address the issues described above by allowing a dynamic impulse response generation process for an environment to be performed. This is enabled by using the properties of a known sound within the environment along with a recording of the sound, with the recording being captured within the environment being considered. Here, dynamic refers to the fact that the process may be performed as and when desired; for instance, whenever a user enters a new environment or whenever a new content is initialised. It is also considered that the process may be performed as a part of a content reproduction process; for example, during gameplay or during the playback of video content the process may be performed intermittently (or in response to a trigger) so as to aid in generating an accurate and up-to-date impulse response for the environment. The process may also be repeated for a number of different locations within the environment, if desired.

One application of such an impulse response generation method is that of gaming; such an application may be particularly suitable given that immersive games may provide content that is displayed so as to appear to be in the room (that is, the environment) with the user. Examples of this include augmented reality (AR) games; these games may use a see-through style display (such as a phone with a camera on the rear so that it can display an image of the environment, or an AR head-mountable display), or a camera may be arranged to capture images of an environment that includes the user and these images may be displayed on a suitable display device (such as a television).

However, embodiments of the present disclosure should not be considered to be limited to such applications as any application in which audio is to be provided to the user may be considered suitable.

For instance, an immersive audio experience may be provided to a user—an example of this is the simulation of the audio of a live concert being provided (with or without corresponding video elements) in which the audio may appear more realistic or immersive if it is adapted so as to sound like the concert is taking place within the listener's own environment. Video content (such as a movie or other non-interactive video elements such as a virtual assistant) may also be provided in a similar manner, particularly if the display of the content is performed so as to have the content appear to be a part of the viewer's environment.

Much of the below discussion is provided within the context of a gaming arrangement, although it should be understood that the teachings are applicable more broadly than this so as to be able to be extended to numerous other types of content, hardware arrangements, and user experiences.

The impulse response of the environment is an acoustic characteristic that describes how the environment modifies a sound that is being reproduced within the environment. For instance, the impulse response can be dependent upon the size of the room, the presence of objects, the materials of various objects (such as the walls), or any other factor that may influence the reproduction of audio within the environment. The impulse response can be considered to be a transfer function that describes how the sound differs between a sound source and a listener (such as a microphone, when generating the impulse response).

When generating the impulse response data for an environment, it is common practice to produce a short and loud sound (an impulse) within the environment and to record corresponding audio at one or more locations within the environment. An example of this is the popping of a balloon within a room, with the room having one or more microphones set up to capture the sound of the balloon popping. Such a sound is preferred due to the ease of processing; a short sound may be easier to separate from echoes or the like, while a loud sound is easy to detect using a microphone. An impulse such as this is also considered useful in that it produces a uniform frequency profile (such that each frequency is produced with the same amplitude), which can simplify the derivation of the impulse response significantly. The impulse response is generated by comparing the frequency profile of the impulse to the frequency profile of the captured audio.

An alternative method for the generation of the impulse response is that of using a sinusoidal sweep (or a comparable sound) that comprises a much greater range of frequencies. A de-convolution process may be performed on the captured audio corresponding to this sound, which can convert the captured audio into an impulse response. This is therefore an example of generating an impulse response without directly utilising an impulse.

Once generated, an impulse response can be convolved with an input sound so as to modify the sound for output. As a result of this convolving, the output sound will take on the acoustic properties of the environment such that the reproduction of the audio will appear to match the room (or other environment as appropriate) more closely. This output audio may therefore be considered more immersive for a user, as the sound will match their expectations (based upon knowledge of the environment they are in, and comparison with other sounds within that environment) more closely.

Such methods are generally limited to professional settings, as the range of equipment and the complexity of the processing that is required can be somewhat prohibitive for a home user. Embodiments of the present disclosure are directed towards a simplified, and more convenient, arrangement for generating the impulse response for an environment.

FIG. 1 schematically illustrates an exemplary arrangement for the reproduction of content in the environment of a user. In this Figure, the environment of the user 100 includes a first display 110, a camera 120, audio output devices 130, and a head-mountable unit 140. One or more of the elements 110, 130, and 140 may be used in this environment for the providing of audio and/or video content to a user as appropriate.

In one example, images of the environment are captured by the camera 120 and are shown on the display 110 (such as a television); this may be performed using an intermediate device such as a games console for generating the images for display, and providing one or more interactive features. Corresponding audio may be output by the display 110 (for instance, via television speakers) or via associated audio output devices such as those 130 shown in the Figure. Such an arrangement may be configured to provide an augmented reality experience in which one or more virtual objects are superimposed upon images of the user's environment such that the virtual objects appear to be present within the environment.

Alternatively, an audio-only experience could be provided in which audio is to be output (for example, via the display 110 or the audio output devices 130) to the user so as to appear that the audio is being generated in the environment itself. For instance, this may include the playback of music in which it may sound like the band is present in the user's environment.

As a further alternative or additional option for content reproduction, the head-mountable unit 140 may be configured to provide image and/or audio content to the user. This content reproduction may be performed in conjunction with outputs from one or more additional image and/or audio output units (such as the display 110 or the audio output devices 130) in some embodiments. The head-mountable unit 140 may comprise a display unit in some embodiments, with the display unit being operable in a see-through display mode. Such a display mode can enable one or more virtual objects to be overlaid upon a user's direct view of the environment. A similar experience can also be generated using a full-immersion head-mountable display (HMD) unit if a camera is associated with the HMD that is operable to capture images of the environment for display to the user.

In view of the above, it is therefore apparent that numerous applications for embodiments of the present disclosure are envisaged that may utilise a number of different combinations of apparatus to achieve a desired effect. Any number of alternative or additional systems may also be considered appropriate for use with embodiments of the present disclosure, so long as the system in question is configurable to utilise an impulse response of the environment to modify one or more aspects of audio that is output to the user.

Figure 2:
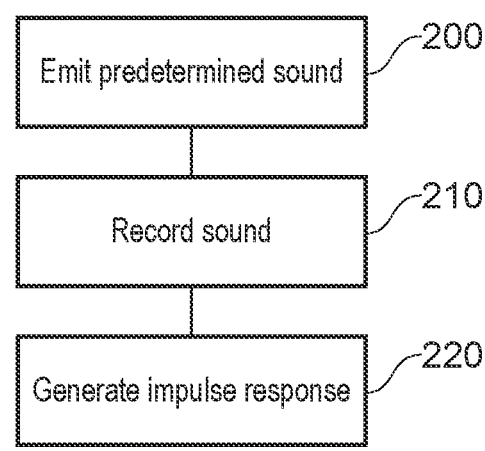
FIG. 2 schematically illustrates an impulse response determination method.

FIG. 2 schematically illustrates an impulse response determination method according to one or more embodiments of the present disclosure.

A step 200 comprises emitting a predetermined sound in the environment using an audio emitting unit. An audio emitting unit may be any suitable loudspeaker, for example. This predetermined sound may take any form; for instance, in some cases it may comprise a short and loud sound approximating an impulse. However, in other embodiments a less impulse-like sound may be emitted. It is considered that any of a range of different sounds may be considered appropriate if the characteristics of the sound are known.

A step 210 comprises recording the predetermined sound that is emitted by the audio emitting unit in step 200 using an audio detection unit. An audio detection unit may be any suitable microphone, for example, and in some embodiments it may be considered that multiple audio detection units may be provided. Here, recording may simply mean 'captured' rather than any storage of the detected audio being required as a part of the impulse response generation process.

A step 220 comprises identifying an impulse response of the environment in dependence upon a frequency response of the audio emitting unit and/or the audio detection unit, and a difference between the predetermined sound and the recorded sound. This identification may take any suitable form as deemed appropriate for generating an impulse response that is representative of an environment.

An example of a suitable process is that of convolution based upon the frequency profile (that is, the amplitude as a function of frequency) of the emitted sound and the frequency profile of the recorded sound. Convolution refers to an operation in which a function is produced that describes the correlation between two existing functions. That is to say that the convolution process here generates an impulse response based upon the emitted and recorded sounds. This process may factor in the frequency response of the emitting/detecting devices as appropriate, for example by using the output of the emitting device rather than the predetermined sound (as the frequency response of the emitting device will modify this).

Figure 3:
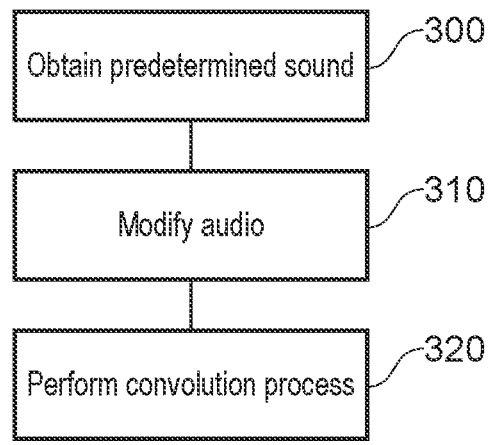
FIG. 3 schematically illustrates an impulse response generation method.

FIG. 3 schematically illustrates an example of such a convolution-based process for identifying an impulse response for an environment. As noted above, this is an exemplary process only and the use of convolution should not be considered essential to the present disclosure. Alternative approaches to generating the impulse response (such as transfer function finding techniques) may also be considered for use where appropriate or desired.

At a step 300 the predetermined sound for emitting is obtained, as well as the recorded sound captured by the audio detection unit. For example, the predetermined sound may be obtained from a database or the like that stores the sound that is to be emitted as a part of the impulse generation process.

At a step 310 processing is performed to modify the recorded sound and/or the predetermined sound for emitting as appropriate so as to account for the audio emitter and/or audio detection units. For instance, the recorded sound may be processed using the frequency response of the audio detection unit to better approximate the received audio. Alternatively, the predetermined sound may be processed using the frequency response of the audio emitter so as to better approximate the sound that is actually emitted. Whatever processing is performed, the aim is to identify a corresponding audio sample for each of the emitter and detector such that a comparison can be made between the samples that is largely free of influence from the limitations (or technical characteristics) of the hardware itself.

At a step 320 a convolution process is performed between selected audio samples in order to generate the impulse response. Here, the selected audio samples may be any of the obtained and/or modified sounds from steps 300 and 310 as appropriate. Examples of an appropriate selection here may be considered to be the emitted/detected sounds (that is, the predetermined sound as modified to account for the properties of the audio emitting unit, and the detected sound), or the predetermined sound and the modified detected audio (that is, the predetermined sound, and the detected sound as modified to account for the properties of the audio detecting unit). The output of the convolution process is considered to be the impulse response of the environment.

This impulse response may be further refined or modified as desired. For example, a modification to achieve a particular effect during audio reproduction using the impulse response may be applied, or a modification to account for expected effects that would cause the generated impulse response to be less accurate (such as body shadowing by the user or the like).

While the method of FIG. 3 shows that the step 310 (in which the predetermined sound and/or the recorded sound are modified) is performed prior to the convolution process being implemented, in some embodiments this is not the case. In one or more other embodiments, the impulse response may be generated in dependence upon the predetermined sound and the detected audio (or any other combination of the sounds) and the frequency response of the audio emitting unit and/or the audio detection unit may be used to modify the generated impulse response directly. For instance, the impulse response may be modified so as to remove the effect of the frequency response of either or both of the audio emitting unit and the audio detection unit.

The impulse response generation method may be performed multiple times using different audio emissions (or different recordings of the same emitted audio, if multiple audio detection units are present in the arrangement). The differences between the generated impulse responses may be removed or reduced in any suitable manner so as to enable the generation of an impulse response that is considered to be more accurate (that is, more representative of the environment) or reliable. An example of such a reduction is the generation of an average of the responses. In some embodiments, a weighted average may be used to generate a finalised impulse response for the environment. For instance, a weighting may be generated so as to prioritise the contribution of impulse responses generated using particularly reliable audio detection units or audio detection units known to have a particular location relative to the audio emitting unit.

In some embodiments, processing may be performed to determine the reliability or accuracy of the impulse response. This processing may take any suitable form, with the aim of ensuring that the generated result meets at least a threshold level of accuracy. A first example of such a process is to compare the impulse response to one or more known responses for known environments, or to compare one or more characteristics of the impulse response to those of known response/environment combinations. If any of the characteristics do not appear to correspond to any known environment, then this may be an indicator that the impulse generation process may need to be performed again as the result may not be reliable. Similarly, if the user is known to be playing at home (for example, based upon location data, user input, or inference from nearby devices) then an impulse response that corresponds more closely to a concert hall than a room (for example) can be determined to be likely to be erroneous.

A second example, which could be implemented as an alternative or additional approach, is to use images of the user's environment to determine an expected impulse response or expected characteristics. For instance, when using an AR arrangement there may be an outward-facing camera that is operable to capture images of the environment. From these images, it may be possible to identify the size of the user's local environment or some context that indicates a likely location (such as large green areas indicating the user being outdoors in a park). Based upon indicators such as environment size or type it may be possible to identify expected characteristics or impulse responses for the environment. The generated impulse response can then be compared to these expected characteristics or responses, and deviations greater than a particular threshold may be seen to indicate an incorrect impulse response being generated. This can then be the trigger for repeating the impulse response generation process, for example.

Another additional or alternative example is that of examining the frequency spectrum of the impulse response to determine whether significant gaps or discontinuities are present, or any other characteristics that would indicate an incomplete or unreliable response.

Examples of suitable integrated audio generation and capture units that may be used for implementing one or more steps of this method are discussed below with reference to FIGS. 4a, 4b, and 4c. While devices comprising both the audio emitting unit and the audio detection unit may be preferred in some embodiments, this is not considered an essential feature. On advantage of the use of a device comprising both units is that the audio emitting unit and the audio detection unit (and their characteristics, such as the frequency response) are both able to be identified by virtue of identifying that single device. However, information about these units could be identified separately for each device containing such a unit—either by identifying the respective devices or by using metadata output by the devices to determine one or more characteristics or identities of the units.

Figure 4A:
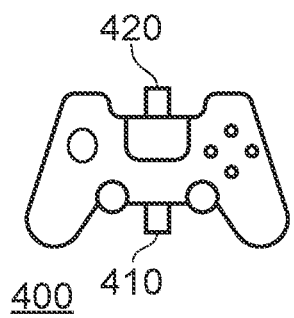
FIGS. 4a, 4b, and 4c schematically illustrate hardware arrangements for implementing one or more parts of the impulse response generation method.

FIG. 4a schematically illustrates a game controller for use with a games console that is configured to emit and capture audio in line with embodiments of the present disclosure. The game controller 400 may have an inbuilt (or modular, added at a time after manufacture for example) microphone 410 and audio emitter 420 that act as an audio detection and an audio emission unit respectively. These may be provided specifically for the impulse response generation process, or may be provided for use for a number of other features (such as notification sounds and chat functions). While the microphone 410 and the audio emitter 420 are shown to be rather prominent in this Figure, of course they may be provided in a much more discreet manner.

Figure 4B:
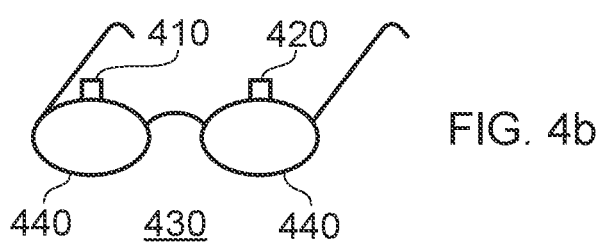

FIG. 4b schematically illustrates a basic glasses-style see-through HMD for use in augmented reality arrangements. The HMD 430 comprises a microphone 410 and an audio emitter 420 that are arranged about the display elements 440. In practice, the HMD may also have associated audio output units for the output of audio content to the user. Such an arrangement may be particularly suited for use in augmented reality applications, as this enables the impulse response generation process to be performed without the user having to carry any additional hardware elements. Such an arrangement can therefore be used to generate AR content with more immersive audio for presentation to the user. Similar configurations may be applied to VR (full-immersion) style hardware, rather than being limited only to AR hardware.

Figure 4C:
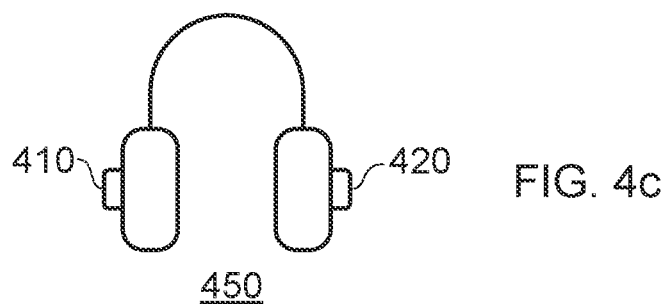

FIG. 4c schematically illustrates a pair of headphones that are adapted for use in an impulse response generating method. This adaptation includes the provision of a microphone 410 and an audio emitter 420; these may be provided so as to also be used for other purposes (such as noise cancellation) in addition to impulse generation. Such an arrangement may be advantageous for the immersive reproduction of audio content, as discussed above. It is also considered that such a device may be able to be used with a display arrangement for the display of video and audio content in a combined fashion—for instance, the headphones may be used as part of an AR or VR application. While shown here as being an over-ear style of headphone, of course the same principles may be applied in the case of in-ear alternatives.

Of course, the location of the microphone 410 and the audio emitter 420 in each of the devices shown in FIGS. 4a, 4b, and 4c may be selected freely; the locations shown here are entirely illustrative and are not intended to be restrictive. While only one of each of these elements 410 and 420 is shown in conjunction with each of the devices, it is also considered that multiple of each or either elements may be provided. For example, a single audio emitter 420 and a plurality of microphones 410 may be provided, or a single microphone 410 and a plurality of audio emitters 420 may be considered. Alternatively, a plurality of microphones 410 and a plurality of audio emitters 420 may be provided as desired or appropriate.

In some embodiments, the devices shown in the Figures described above may comprise a processing element that is configured to generate an impulse response based upon the emitted/detected audio as has been described. However, in other embodiments it may be considered that at least some of the processing is performed by one or more other devices. Suitable other devices may include games consoles, mobile phones, personal computers, or any other device having sufficient processing capabilities. In such cases, the audio itself (the predetermined sound and/or detected audio) may be transmitted to the one or more external devices, and/or one or more representations of characteristics of the audio may be transmitted.

As an alternative, or additional, sound emission in step 200 of FIG. 2, it is considered that a user may be instructed to make a particular sound that is able to be recorded by the audio detection unit. While this may result in the generation of an impulse response having a lower accuracy (as it may be difficult to accurately identify characteristics of the generated sound), it may be advantageous in a number of scenarios. For instance, this may be advantageous where only low-quality audio emitting units are available, or no audio emitting units (or at least no audio emitting units for which characteristics are known) are available at all. When used as an additional sound emission to that of the audio emission unit, the increased amount of audio information available for processing may enable a more accurate impulse response generation than using the sound from the audio emitting unit only.

In some cases, the user may be directed to mimic a particular sound that is provided—for example, to whistle or clap (in some cases, with the aim of reproducing a sound that is played to the user), or to read out specified text or reproduce particular phonemes. This can reduce the uncertainty in the sound emission by the user, which may enable a more accurate generation of the impulse response, relative to the user being directed to make noise generally. In some cases, the user may be directed to generate a number of different sounds having different associated frequencies (such as a high-pitched sound and a low-pitched sound) to assist with generating a desired range of spectral information for generation of the impulse response.

Once captured, the audio produced by the user may be subjected to signal processing so as to extract the main formants (that is, the main peaks of the captured audio). These formants may be determined based upon any characteristic of the audio itself, such as peak magnitude or width, although in many cases it may simply be the first response that is identified in the audio if the user is located sufficiently close to the audio detection unit (as the primary audio will reach the detector before most reflected audio). A deconvolution process may then be applied to the audio to extract impulse response components at the frequencies of those main formants; it is therefore considered that the use of a number of different sounds having formants at different frequencies may be considered to be advantageous.

In some embodiments, as noted above, a method in which a game controller is used for audio emission and detection is considered advantageous. An example of such a game controller is shown in FIG. 4a, although it is considered that any form of controller may be suitable so long as it comprises an audio emitting unit, an audio detection unit (such as an integrated microphone), and one or more input generating units (so as to enable use as a game controller). An input generating unit may be a button that is operable by the user to generate an input to a device (such as a games console), or an inertial sensor (such as an accelerometer or gyroscope) which enables an input to be generated based upon the user's movement of the game controller.

In an example use case for such a device, the audio emitting unit associated with the game controller is controlled to emit a predetermined sound. The audio detection unit is operable to detect an audio sample comprising the emitted sound, both the direct sound and any audio signals caused by the sound being reflected from surfaces within the environment. Upon recording this audio sample, the game controller may be configured to perform the impulse response generation processing or to transmit information about the audio sample (optionally including the audio sample itself) to the associated games console (or another device, such as a mobile phone or an HMD) for the purpose of performing such processing.

Such an implementation may be suitable for use with a wide range of applications, as a controller may be provided for use with a number of different VR, AR, and interactive experiences. A similar advantage may be obtained using an HMD or headphones that each comprises an audio emitting unit and an audio detection unit (as discussed above). An additional advantage of using a device comprising both units is in that the separation of the units is known—therefore only a single tracking process may be required to locate both units within the environment.

Embodiments of the present disclosure are not limited to applications in which a single device comprises both the audio emitting unit and the audio detection unit. In some embodiments, the user may be using a plurality of devices for interaction with and/or presentation of content; in such embodiments, the process may be performed utilising elements from a number of different devices. For example, a first device (such as a game controller) may be configured to emit a sound while a second device (such as an HMD) may be configured to detect it. This may enable a simplification of each device—for instance, in this exemplary application it would not be necessary to provide the game controller with an audio detection unit and the HMD with an audio emission unit.

In some embodiments, it is also considered that multiple devices may be used in other configurations. For example, two game controllers could be used (such as in a multiplayer arrangement) that each perform individual impulse response generation processes that may be used to determine a correct impulse response for the environment. For example, an average of the responses may be taken or the response that appears to be most reliable may be used. Each of the devices may use a different predetermined sound, thereby increasing the frequency spectrum that is considered in the response generation process. In some cases, it may be considered advantageous that each of the devices is able to detect the sounds emitted by the other device—further increasing the amount of information that is available for generating a reliable impulse response for the environment.

In such embodiments, any suitable number of active (that is, devices that emit audio) and passive devices (devices that only detect audio) may be utilised as appropriate. In other words, some devices may be configured to only detect audio emitted by another device, some devices may be configured only to emit audio for detection by other devices, and some devices may be operable to both emit audio and to detect audio (their own emitted audio and/or audio emitted by one or more of the other devices). One or more active devices may perform an audio detection function, as appropriate. It is further considered that the user may be directed to create sounds as described above even in multiple-device arrangements.

As in the embodiments discussed above, any (or each) of the active/passive devices may be used to generate the impulse response, or the process may be performed (at least in part) by a processing device that does not comprise any of the audio emitting or detecting units that are used to generate the audio data.

Figure 5:
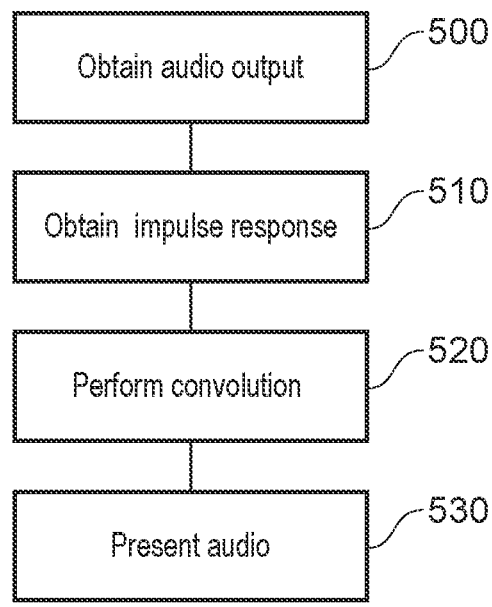
FIG. 5 schematically illustrates an audio output method.

Once the impulse response has been generated and any desired processing performed to modify the impulse response, it can be used to modify audio intended for presentation to a user (the user being a person to whom the content is presented, rather than necessarily implying any interaction being required). FIG. 5 schematically illustrates an example of such a process.

At a step 500, the audio for output to the user is obtained. This may be obtained from any suitable sources; for instance, locally stored game files may be considered. Alternatively, or in addition, the audio may be sourced from a removable storage medium or a remote server as desired. This audio may be selected based upon events within content being provided to the user (such as audio triggered by an in-game event), or may be selected by the user (for instance, controlling a character in a game to recite a particular line).

At a step 510, the impulse response for the user's environment is obtained. This may be obtained from any suitable storage source (as discussed above for the audio for output), with the impulse response being the result of any method according to embodiments of the present disclosure.

At a step 520, a convolution process is performed using the audio for output (as obtained in step 500) and the impulse response (as obtained in step 510) to generate output audio. This convolution process causes the audio for output to be modified in line with the impulse response for the environment, thereby increasing the acoustic realism of the audio when reproduced in that environment.

At a step 530, the output audio is presented to the user via one or more loudspeakers. These loudspeakers may be implemented in any suitable fashion, and using any suitable hardware—for instance, a surround sound speaker system or a pair of headphones may be considered appropriate.

Figure 6:
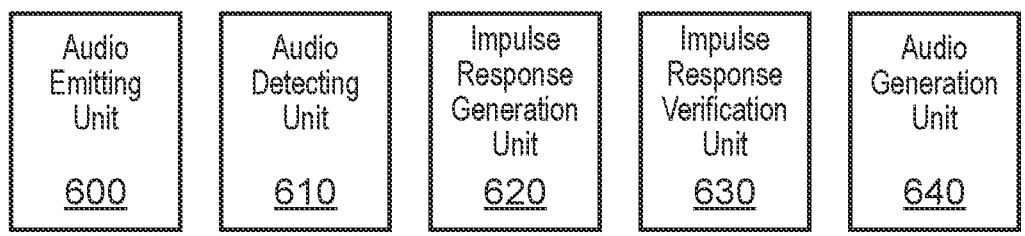
FIG. 6 schematically illustrates a system for determining the impulse response of an environment.

FIG. 6 schematically illustrates a system for determining the impulse response of an environment. The system comprises an audio emitting unit 600, an audio detection unit 610, an impulse response generation unit 620, an optional impulse response verification unit 630, and an optional audio generation unit 640. These units may be incorporated into one or more devices as appropriate; for instance, the audio emitting unit 600 and the audio detection unit 610 may be implemented as a part of a first device (such as a game controller or display device), while the remaining units are implemented as a part of one or more separate processing devices (such as a games console or a cloud processing arrangement).

The audio emitting unit 600 is operable to emit a predetermined sound in the environment. This predetermined sound may be selected in dependence upon the environment, or may be a standard sound output associated with the audio emitting unit 600 (such as an initialisation sound played upon start-up of a device). In some embodiments, a range of different predetermined sounds may be played in succession so as to increase the spectral range of the audio that is emitted and/or detected.

The audio detection unit 610 is operable to record the sound output by the audio emitting unit 600. An example of a suitable audio detection unit 610 may be a microphone associated with a device; this microphone may also be used for voice inputs or communication by a user, or may be a dedicated microphone for the impulse generation process.

The impulse response generation unit 620 is operable to identify an impulse response of the environment in dependence upon a frequency response of the audio emitting unit 600 and/or the audio detection unit 610, and a difference between the predetermined sound and the recorded sound.

The impulse response generation unit 620 may be operable to modify the recorded sound in dependence upon the frequency response of the audio emitting unit and/or the audio detecting unit, and to generate the impulse response in dependence upon this modified audio and the predetermined sound. Alternatively, or in addition, the impulse response may be generated based upon the predetermined sound and the recorded sound directly, with the generated impulse response being modified in accordance with the identified frequency response or responses as appropriate.

In some embodiments, the frequency response of the audio emitting unit 600 and/or the audio detection unit 610 is determined based upon an identification of the device or devices comprising the respective units. Alternatively, or in addition, the units (or the device or devices comprising those units) may output specific frequency response information so as to avoid the need to identify the device and obtain the frequency response separately. In some embodiments, associated hardware may be provided in combination (such as a single controller being compatible with a games console) and in such cases it may not be necessary to provide any information at all as the frequency response can be determined ahead of time without further information.

The optional impulse response verification unit 630 is operable to determine the reliability of the identified impulse response for the environment; such a determination is not necessary for the generation of an impulse response, but may be considered beneficial as it may lead to an improved impulse response and therefore improved audio output within the environment. The reliability of the impulse response may be determined in any suitable fashion. In some embodiments, the impulse response verification unit 630 is operable to determine the reliability in dependence upon one or more characteristics of the impulse response or the environment. In the former case, this may comprise an analysis of the impulse response to identify one or more discontinuities or inconsistencies within the response.

In the latter case, one or more properties of the environment may be determined (or known, for example via an input from the user) and this may be used to constrain the allowable values of the impulse response—such that if the values do not fall within the allowable range for the environment then the response is considered to be unreliable or invalid. For instance, if a room is considered to be small then an allowable range may be set that excludes characteristics associated with larger environments. In some embodiments, the characteristics of the environment are identified from images captured of the environment, wherein image processing is performed so as to identify one or more aspects of the environment such as size or materials present. These images may be captured as part of a user tracking process, for example, or via an outward-facing camera associated with an HMD or the like worn by a user.

The optional audio generation unit 640 is operable to generate audio for presentation to the user; this unit may be considered optional as in some cases the impulse response may instead (or also) be stored for future use as part of an audio reproduction process. An example of this is if the impulse response is generated as a part of a console calibration process, with the audio generation being performed for one or more games at a later time.

The audio generation process may be implemented by performing a convolution process between audio associated with content to be provided to a user and the impulse response, for example. This audio may then be output to the user via any suitable audio output unit, such as a loudspeaker arrangement. This content may comprise one or more virtual elements for display in an augmented reality arrangement, in addition to the audio that is intended to be presented, or any other visual elements (such as for a virtual reality or other gaming experience) rather than being limited to AR.

As discussed above, a number of different hardware configurations are considered as embodiments of the present disclosure. For instance, the impulse response generation unit 620 may be located in a games console, as may the impulse response verification unit 630 and/or the audio output unit 640. A game controller may be provided that incorporates at least the audio emitting unit 600 and/or the audio detection unit 610; alternatively a head-mountable apparatus (such as an HMD or headphones) may be provided that incorporates at least the audio emitting unit 600 and/or the audio detection unit 610. In some embodiments, it is considered that the audio emitting unit 600 and the audio detection unit 610 are located at different devices; an example of such an arrangement may be a games controller with an audio emitting unit 600, an HMD with an audio detection unit 610, and a games console with at least the impulse response generation unit 620. Of course, any suitable arrangement of these functions may be provided without diverging from the teachings of the present disclosure.

Further to this, it is considered that a number of devices and/or units may be provided rather than only a single of each. For instance, a pair of game controllers may be provided that each comprise one or more audio emitting units 600 and/or audio detecting units 610. These may be used to implement separate impulse response generation processes, or data may be obtained from each to generate an impulse response for the environment. In another exemplary arrangement, a game controller may be provided with both an audio emitting unit 600 and an audio detection unit 610, with an HMD being provided that comprises an additional audio detection unit 610 to provide a second detection of the audio. This may enable an increased reliability of the impulse response generation, due to the increase in available audio data captured within the environment.

In some cases, one or more sounds may be generated by a user to replace or supplement the audio emitted by the audio emitting unit 600. In such cases, a user within the environment is directed to generate one or more sounds, with the audio detection unit 610 being operable to record the sounds generated by the user. The impulse response generation unit 620 is then operable to generate an impulse response of the environment in dependence upon these recorded sounds in addition to (or instead of) those emitted by the audio emitting unit.

The arrangement of FIG. 6 is an example of a processor (for example, a GPU and/or CPU located in a games console or any other computing device) that is operable to implement a method for determining an impulse response of an environment, and in particular is operable to:

cause an audio emitting unit to emit a predetermined sound in the environment;

cause an audio detection unit to record the sound output by the audio emitting unit; and identify an impulse response of the environment in dependence upon a frequency response of the audio emitting unit and/or the audio detection unit, and a difference between the predetermined sound and the recorded sound.

As noted above, rather than a single processor being configured to perform these tasks the processing may be distributed amongst one or more local and/or remote processors or processing devices.

Figure 7:
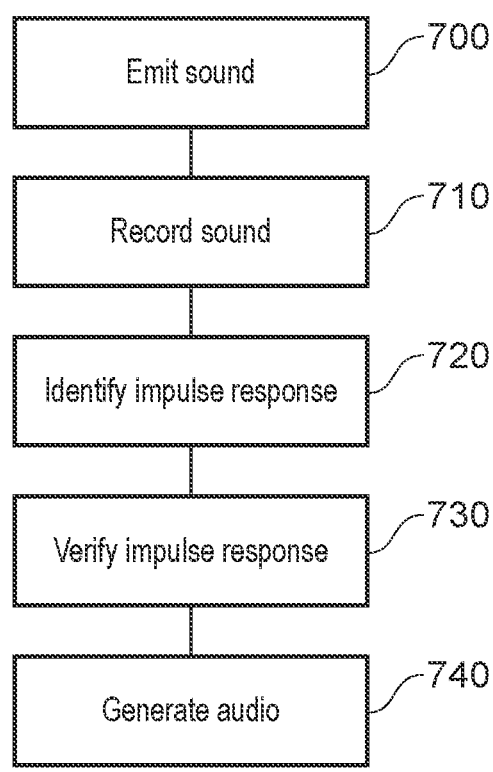
FIG. 7 schematically illustrates a method for determining the impulse response of an environment.

FIG. 7 schematically illustrates a method for determining the impulse response of an environment.

A step 700 comprises emitting a predetermined sound in the environment using audio emitting unit, and/or directing a user to generate one or more sounds.

A step 710 comprises recording, using an audio detection unit, the sound output by the audio emitting unit and/or the sounds generated by the user.

A step 720 comprises identifying an impulse response of the environment in dependence upon a frequency response of the audio emitting unit and/or the audio detection unit, and a difference between the predetermined sound and the recorded sound.

An optional step 730 comprises determining the reliability of the identified impulse response for the environment.

An optional step 740 comprises generating audio for presentation to the user, for example by performing a convolution process between audio associated with content to be provided to a user and the impulse response.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be provided in accordance with any one or more of the following numbered clauses:

1. A system for determining the impulse response of an environment, the system comprising:

an audio emitting unit operable to emit a predetermined sound in the environment;

an audio detection unit operable to record the sound output by the audio emitting unit; and an impulse response generation unit operable to identify an impulse response of the environment in dependence upon a frequency response of the audio emitting unit and/or the audio detection unit, and a difference between the predetermined sound and the recorded sound.

2. A system according to clause 1, wherein the frequency response of the audio emitting unit and/or the audio detection unit is determined based upon an identification of the device or devices comprising the respective units.

3. A system according to any preceding clause, wherein the impulse response generation unit is operable to modify the recorded sound in dependence upon the frequency response of the audio emitting unit and/or the audio detecting unit, and to generate the impulse response in dependence upon this modified audio and the predetermined sound.

4. A system according to any preceding clause, comprising an impulse response verification unit operable to determine the reliability of the identified impulse response for the environment.

5. A system according to clause 4, wherein the impulse response verification unit is operable to determine the reliability in dependence upon one or more characteristics of the impulse response or the environment.

6. A system according to clause 5, wherein the characteristics of the environment are identified from images captured of the environment.

7. A system according to any preceding clause, wherein:

a user within the environment is directed to generate one or more sounds;

the audio detection unit is operable to record sounds generated by the user; and the impulse response generation unit is operable to generate an impulse response of the environment in dependence upon these recorded sounds in addition to those emitted by the audio emitting unit.

8. A system according to any preceding clause, comprising an audio generation unit operable to generate audio for presentation to the user by performing a convolution process between audio associated with content to be provided to a user and the impulse response.

9. A system according to clause 8, wherein the content to be provided comprises one or more virtual elements for display in an augmented reality arrangement.

10. A system according to any preceding clause, wherein the impulse response generation unit is located in a games console.

11. A system according to any preceding clause, wherein the system comprises a game controller that incorporates at least the audio emitting unit and/or the audio detection unit.

12. A system according to any of clauses 1-10, wherein the system comprises a head-mountable apparatus that incorporates at least the audio emitting unit and/or the audio detection unit.

13. A method for determining the impulse response of an environment, the method comprising:
- emitting a predetermined sound in the environment using audio emitting unit;
- recording, using an audio detection unit, the sound output by the audio emitting unit; and
- identifying an impulse response of the environment in dependence upon a frequency response of the audio emitting unit and/or the audio detection unit, and a difference between the predetermined sound and the recorded sound.

14. Computer software which, when executed by a computer, causes the computer to carry out the method of clause 13.

15. A non-transitory machine-readable storage medium which stores computer software according to clause 14.

The invention claimed is:

1. A system for determining the impulse response of an environment, the system comprising:
- an audio emitting unit operable to emit a predetermined sound in the environment;
- an audio detection unit operable to record the sound output by the audio emitting unit; and
- an impulse response generation unit operable to identify an impulse response of the environment in dependence upon a frequency response of the audio emitting unit and/or the audio detection unit, and a difference between the predetermined sound and the recorded sound, wherein:
- a user within the environment is directed to generate one or more sounds,
- the audio detection unit is operable to record the one or more sounds generated by the user, and
- the impulse response generation unit is operable to generate the impulse response of the environment in dependence upon the one or more sounds recorded in addition to those emitted by the audio emitting unit.

2. The system of claim 1, wherein the frequency response of the audio emitting unit and/or the audio detection unit is determined based upon an identification of the device or devices comprising the respective units.

3. The system of claim 1, wherein the impulse response generation unit is operable to modify the recorded sound in dependence upon the frequency response of the audio emitting unit and/or the audio detecting unit, and to generate the impulse response in dependence upon this modified audio and the predetermined sound.

4. The system of claim 1, comprising an impulse response verification unit operable to determine the reliability of the identified impulse response for the environment.

5. The system of claim 4, wherein the impulse response verification unit is operable to determine the reliability in dependence upon one or more characteristics of the impulse response or the environment.

6. The system of claim 5, wherein the characteristics of the environment are identified from images captured of the environment.

7. The system of claim 1, comprising an audio generation unit operable to generate audio for presentation to the user by performing a convolution process between audio associated with content to be provided to a user and the impulse response.

8. The system of claim 7, wherein the content to be provided comprises one or more virtual elements for display in an augmented reality arrangement.

9. The system of claim 1, wherein the impulse response generation unit is located in a games console.

10. The system of claim 1, wherein the system comprises a game controller that incorporates at least the audio emitting unit and/or the audio detection unit.

11. The system of claim 1, wherein the system comprises a head-mountable apparatus that incorporates at least the audio emitting unit and/or the audio detection unit.

12. A method for determining the impulse response of an environment, the method comprising:
- emitting a predetermined sound in the environment using audio emitting unit;
- recording, using an audio detection unit, the sound output by the audio emitting unit; and
- identifying an impulse response of the environment in dependence upon a frequency response of the audio emitting unit and/or the audio detection unit, and a difference between the predetermined sound and the recorded sound, wherein:
- a user within the environment is directed to generate one or more sounds,
- the recording includes recording the one or more sounds generated by the user, and
- the identifying includes generating the impulse response of the environment in dependence upon the one or more sounds recorded in addition to those emitted by the audio emitting unit.

13. A non-transitory machine-readable storage medium which stores computer software which, when executed by a computer, causes the computer to perform a method for determining the impulse response of an environment, the method comprising:
- emitting a predetermined sound in the environment using audio emitting unit;
- recording, using an audio detection unit, the sound output by the audio emitting unit; and
- identifying an impulse response of the environment in dependence upon a frequency response of the audio emitting unit and/or the audio detection unit, and a difference between the predetermined sound and the recorded sound, wherein:
- a user within the environment is directed to generate one or more sounds,
- the recording includes recording the one or more sounds generated by the user, and
- the identifying includes generating the impulse response of the environment in dependence upon the one or more sounds recorded in addition to those emitted by the audio emitting unit.

* * * * *